(12) United States Patent
Moore et al.

(10) Patent No.: US 9,646,314 B2
(45) Date of Patent: May 9, 2017

(54) SYSTEMS AND METHODS FOR PROVIDING A PROMOTION FOR A COMBINED PRODUCT DISPENSED FROM A PRODUCT DISPENSER

(75) Inventors: William J. Moore, Lilburn, GA (US);
C. Brad Green, Dacula, GA (US);
David O. Slagley, Roswell, GA (US);
David R. Newman, Atlanta, GA (US);
Gregg Carpenter, Marietta, GA (US);
Gene Farrell, Duluth, GA (US); Eric L. Pribyl, Bedford, NH (US); Michael Jason Goulet, Weare, NH (US); Scott Cuppari, Smyrna, GA (US); Cynthia D. Jones, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 710 days.

(21) Appl. No.: 13/452,444

(22) Filed: Apr. 20, 2012

(65) Prior Publication Data
US 2013/0282451 A1     Oct. 24, 2013

(51) Int. Cl.
*G06Q 30/00*     (2012.01)
*G06Q 30/02*     (2012.01)
*G07F 7/00*      (2006.01)
*B67D 1/00*      (2006.01)
*B67D 1/08*      (2006.01)
(Continued)

(52) U.S. Cl.
CPC .......... *G06Q 30/02* (2013.01); *B67D 1/0015* (2013.01); *B67D 1/0021* (2013.01); *B67D 1/0882* (2013.01); *G07F 7/00* (2013.01); *G07F 11/002* (2013.01); *G07F 11/72* (2013.01); *G07F 13/06* (2013.01); *G07F 13/065* (2013.01); *G07F 17/0064* (2013.01)

(58) Field of Classification Search
CPC .......... G07F 13/065; G07F 7/00; G07F 13/06; B67D 1/0021; B67D 1/0882; B67D 1/0015; G06Q 30/02
USPC ...................................... 705/14.38
See application file for complete search history.

(56) References Cited

U.S. PATENT DOCUMENTS 7,099,740 B2 *   8/2006   Bartholomew et al. ...... 700/231
7,648,050 B1     1/2010   Ehlers
(Continued)

FOREIGN PATENT DOCUMENTS

WO     2009/032929 A2     3/2009

OTHER PUBLICATIONS

Sullivan, Laurie. Coca-Cola Freestyles A Smarter Soda Machine. www.mediapost.com Aug. 17, 2009.*
(Continued)

*Primary Examiner* — Johnna Loftis
(74) *Attorney, Agent, or Firm* — Merchant & Gould P.C.

(57) ABSTRACT

Embodiments of the invention can include systems and methods for providing a promotion for a combined product dispensed from a product dispenser. In one embodiment, a system can provide a promotion for a combined product dispensed from a product dispenser. The system can include a code generation module operable to receive data associated with a plurality of product recipes; and generate a machine readable item with a promotion identifier, and a combined recipe including the plurality of product recipes, wherein the machine readable item configures a product dispenser to promote and dispense the combined recipe.

18 Claims, 6 Drawing Sheets

(51) Int. Cl.
*G07F 13/06* (2006.01)
*G07F 17/00* (2006.01)
*G07F 11/00* (2006.01)
*G07F 11/72* (2006.01)

(56) References Cited

U.S. PATENT DOCUMENTS

| | | | |
|---|---|---|---|
| 8,162,176 | B2 | 4/2012 | Rudick |
| 8,565,916 | B2 | 10/2013 | Zhang et al. |
| 8,739,840 | B2 | 6/2014 | Mattos, Jr. et al. |
| 8,744,618 | B2 * | 6/2014 | Peters et al. .............. 700/236 |
| 8,751,037 | B2 * | 6/2014 | Peters et al. .............. 700/236 |
| 8,755,932 | B2 | 6/2014 | Peters et al. |
| 8,757,222 | B2 | 6/2014 | Rudick et al. |
| 9,067,775 | B2 | 6/2015 | Mattos, Jr. et al. |
| 2008/0262648 | A1 | 10/2008 | Kriston et al. |
| 2009/0065520 | A1 | 3/2009 | Peters et al. |
| 2009/0065570 | A1 | 3/2009 | Peters et al. |
| 2009/0069932 | A1 | 3/2009 | Rudick |
| 2009/0069949 | A1 | 3/2009 | Carpenter et al. |
| 2009/0070234 | A1 * | 3/2009 | Peters et al. .............. 705/27 |
| 2009/0105876 | A1 | 4/2009 | Simpson et al. |
| 2009/0187279 | A1 | 7/2009 | Bernier et al. |
| 2011/0049180 | A1 | 3/2011 | Carpenter et al. |
| 2011/0123688 | A1 | 5/2011 | Deo et al. |
| 2013/0245819 | A1 * | 9/2013 | Davenport et al. .......... 700/231 |

OTHER PUBLICATIONS

PCT Search Report dated Mar. 27, 2014 in Appln No. PCT/US13/35737, 17 pgs.
Eric Sforza. "The Genius and Failure of Coca-Cola Freestyle." Innovation Excellence <http://www.innovationexcellence.com/blog/2012/01/07/the-genius-and-failure-of-coca-cola-freestyle/>. Jan. 7, 2012. 3 pages.
"Coca-Cola Freestyle Launches Virtually on Facebook." Coca-Cola Press Center—Company Articles <http://www.thecoca-colacompany.com/dynamic/press_center/2011/09/coca-cola-free-style-launches-virtually-on-facebook.html>. 2 pages.
Freestyle Facebook Application Screenshots. 7 pages.
Australian Examination Report dated Oct. 27, 2014 in Appln No. 2013204812, 3 pgs.

* cited by examiner

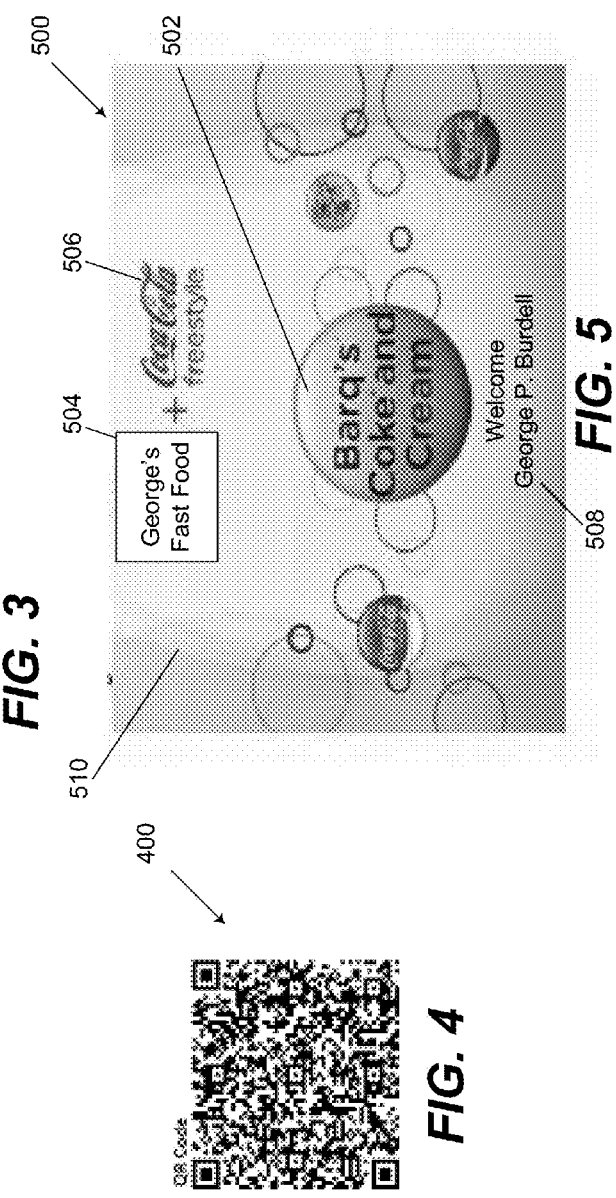

(Code Generation Module Perspective)

(Product Dispenser Perspective)

*(Perspective of Dispenser Reporting)*

SYSTEMS AND METHODS FOR PROVIDING A PROMOTION FOR A COMBINED PRODUCT DISPENSED FROM A PRODUCT DISPENSER

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD OF THE INVENTION

This invention relates to product dispensers, and in particular, relates to systems and methods for providing a promotion for a combined product dispensed from a product dispenser.

BACKGROUND OF THE INVENTION

Conventional product dispensers can pour a beverage by combining a syrup, sweetener, and/or water. To create a finite variety of beverage selections different kinds of syrup can be offered. This typically results in being able to offer a finite number of branded and non-branded beverage selections. As an example, a single prior art dispenser using several different kinds of syrup might be able to offer limited choices of COCA-COLA™, DIET COCA-COLA™, SPRITE™, and a few other branded or non-branded beverage selections.

One problem with these types of conventional product dispensers is that only a limited number of drinks can be offered. As such, conventional product dispensers may be limited in being able to offer the consumer what they want. In this regard, consumers want a wider menu of beverage selections and the ability to customize their beverage. Research suggests that they want more beverage variations even for a traditional branded beverage. For example, offering COCA-COLA™, COCA-COLA™ with lime, CHERRY COCA-COLA™, VANILLA COCA-COLA™ and numerous other types of COCA-COLA™ beverage variations. Offering all the variations possible for a single drink brand such as COCA-COLA™ are impractical in conventional product dispensers in part because conventional product dispensers have limited capacity and selection capability. They may not offer the consumer what the consumer wants, that is, a complete variety of choices for all types of branded and non-branded beverages.

Product dispensers historically have worked by combining a diluent (such as water) with a beverage base. These beverage bases usually have a reconstitution ratio of about 3:1 to 6:1. The beverage bases usually come in large containers that require large amounts of storage space and may need to be refrigerated. These requirements often necessitate the need to store these containers far from the actual dispenser and to run long lines from the containers to the dispenser.

While certain improvements in shelf life and concentration can be obtained from certain conventional product dispensers described above, there is a desire for a product dispenser that can produce even more and different types of beverages while using a smaller footprint. This can be accomplished by breaking down the traditional beverage bases into constituent parts at much higher reconstitution ratios. These parts can then be stored in much smaller packages and stored closer to, adjacent to, or within the product dispenser itself. The product dispenser preferably can give the consumer multiple beverage options such that the consumer has the ability to customize his or her beverage as desired.

SUMMARY OF THE INVENTION

Some or all of the above needs and/or problems may be addressed by embodiments of the invention. Embodiments of the invention can include systems and methods for providing a promotion for a combined product dispensed from a product dispenser. In one embodiment, a system for providing a combined product for dispensing from a product dispenser. The system can include a code generation module operable to receive data associated with a first product recipe; receive data associated with a second product recipe; and generate a machine readable item with a promotion identifier, and a combined recipe including at least a portion of the first product recipe and at least a portion of the second product recipe, wherein the machine readable item configures a product dispenser to promote and dispense the combined recipe.

In some embodiments, a code generation module can be further operable to receive data for a ratio associated with the first product recipe; and receive data for a ratio associated with the second product recipe; wherein the combined recipe can include the ratio associated with the first product recipe and the ratio associated with the second product recipe.

In some embodiments, a code generation module can be further operable to normalize at least a ratio associated with the first product recipe or a ratio associated with the second product recipe if a combined ratio is not equal to a predefined total ratio; wherein the combined recipe can include a normalized ratio associated with the first product recipe or a normalized ratio associated with the second product recipe.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, a code generation module can be further operable to perform at least one of the following: store encoded data associated with the combined recipe, print encoded data associated with the combined recipe, display encoded data associated with the combined recipe, electronically transmit encoded data associated with the combined recipe for printing or displaying by a user, or output encoded data associated with the combined recipe.

In some embodiments, a code generation module can be further operable to validate the promotion identifier or combined recipe against at least one predefined rule.

In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In some embodiments, a code generation module can be further operable to transmit the machine readable item to a processor-based device associated with user, wherein the processor-based device outputs the machine readable item to at least one reader device associated with a product dispenser.

In another embodiment, a computer program product with a computer readable medium having computer readable program code can be provided. The computer readable program code can be operable to be executed to implement a method for providing a promotion for a combined product dispensed from a product dispenser. The method can include receiving data associated with a first product recipe; receiving data associated with a second product recipe; generating a machine readable item with a promotion identifier, and a combined recipe comprising at least a portion of the first product recipe and at least a portion of the second product recipe, wherein the machine readable item configures a product dispenser to promote and dispense the combined recipe, wherein the machine readable item comprises at least one of the following: a bar code, a 2D bar code, a QR code, a RFID tag, a NFC chip, a data matrix, an alphanumeric string, a character string, a short message service or text message, encoded data, or encrypted data; and transmitting the machine readable item to a mobile device associated with user, wherein the processor-based device outputs the machine readable item to at least one reader device associated with a product dispenser.

In some embodiments, the method can further include receiving data for a ratio associated with the first product recipe; receiving data for a ratio associated with the second product recipe; wherein the combined recipe comprises the ratio associated with the first product recipe and the ratio associated with the second product recipe; and normalizing at least a ratio associated with the first product recipe or a ratio associated with the second product recipe if a combined ratio is not equal to a predefined total ratio; wherein the combined recipe can include a normalized ratio associated with the first product recipe or a normalized ratio associated with the second product recipe.

In some embodiments, the generating the machine readable item can include at least one of the following: storing encoded data, printing encoded data, displaying encoded data, electronically transmitting encoded data for printing or displaying by a user, or outputting encoded data.

In some embodiments, a method can further include validating the promotion identifier or combined recipe against at least one predefined rule comprising at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In yet another embodiment, a method for providing a product for providing a promotion for a combined product dispensed from a product dispenser can be provided. The method can include receiving data associated with a first product recipe; receiving data associated with a second product recipe; and generating a machine readable item with a promotion identifier, and a combined recipe comprising at least a portion of the first product recipe and at least a portion of the second product recipe, wherein the machine readable item configures a product dispenser to promote and dispense the combined recipe.

In some embodiments, a method can further include receiving data for a ratio associated with the first product recipe; and receiving data for a ratio associated with the second product recipe; wherein the combined recipe comprises the ratio associated with the first product recipe and the ratio associated with the second product recipe.

In some embodiments, a method can further include normalizing at least a ratio associated with the first product recipe or a ratio associated with the second product recipe if a combined ratio is not equal to a predefined total ratio; wherein the combined recipe comprises a normalized ratio associated with the first product recipe or a normalized ratio associated with the second product recipe.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, generating the machine readable item can include at least one of the following: storing encoded data, printing encoded data, displaying encoded data, electronically transmitting encoded data for printing or displaying by a user, or outputting encoded data.

In some embodiments, a method can further include validating the promotion identifier or combined recipe against at least one predefined rule.

In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In some embodiments, a method can further include transmitting the machine readable item to a processor-based device associated with a user, wherein the processor-based device outputs the machine readable item to at least one reader device associated with a product dispenser.

In another embodiment, a method for configuring a product dispenser to provide a promotion for a combined product is provided. The method can include receiving information from a machine readable item. The machine readable item can include data associated with a promotion identifier, a first product recipe, and data associated with a second product recipe; wherein at least a portion of the first product recipe and at least a portion of the second product recipe comprise a combined recipe. The method can further include dispensing a product using the combined recipe for at least one predefined promotion.

In some embodiments, a machine readable item can further include data for a ratio associated with the first product recipe, and data for a ratio associated with the second product recipe, wherein the combined recipe comprises the ratio associated with the first product recipe and the ratio associated with the second product recipe.

In some embodiments, the method can further include normalizing at least the ratio associated with the first product recipe or the ratio associated with the second product recipe if a combined ratio is not equal to a predefined total ratio, wherein the combined recipe comprises a normalized ratio associated with the first product recipe or a normalized ratio associated with the second product recipe.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, receiving information from a machine readable item can include at least one of the following: receiving encoded data, receiving printed encoded data, receiving displayed encoded data, receiving a QR code from a mobile device, receiving a printed QR code, or electronically receiving encoded data.

In some embodiments, the method can further include validating the promotion identifier or combined recipe against at least one predefined rule.

In some embodiments, the at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In yet another embodiment, a system for providing a promotion for a combined product dispensed from a product dispenser. The system can include a code generation module operable to receive data associated with a plurality of product recipes; and generate a machine readable item with a promotion identifier, and a combined recipe including the plurality of product recipes, wherein the machine readable item configures a product dispenser to promote and dispense the combined recipe.

In some embodiments, a code generation module can be further operable to receive data for at least one ratio associated with the plurality of product recipes; wherein the combined recipe can include the at least one ratio associated with the plurality of product recipes.

In some embodiments, a code generation module can be further operable to normalize the at least one ratio associated with the plurality of product recipes if a combined ratio is not equal to a predefined total ratio; wherein the combined recipe can include at least one normalized ratio associated with the plurality of product recipes.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, a code generation module can be further operable to perform at least one of the following: store encoded data associated with the combined recipe, print encoded data associated with the combined recipe, display encoded data associated with the combined recipe, electronically transmit encoded data associated with the combined recipe for printing or displaying by a user, or output encoded data associated with the combined recipe.

In some embodiments, a code generation module can be further operable to validate the promotion identifier or combined recipe against at least one predefined rule.

In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In some embodiments, a code generation module can be further operable to transmit the machine readable item to a processor-based device associated with user, wherein the processor-based device outputs the machine readable item to at least one reader device associated with a product dispenser.

In another embodiment, a computer program product with a computer readable medium having computer readable program code can be provided. The computer readable program code can be operable to be executed to implement a method for providing a promotion for a combined product dispensed from a product dispenser. The method can include receiving data associated with a plurality of product recipes; generating a machine readable item with a promotion identifier, and a combined recipe comprising the plurality of the product recipes, wherein the machine readable item configures a product dispenser to promote and dispense the combined recipe, wherein the machine readable item comprises at least one of the following: a bar code, a 2D bar code, a QR code, a RFID tag, a NFC chip, a data matrix, an alphanumeric string, a character string, a short message service or text message, encoded data, or encrypted data; and transmitting the machine readable item to a mobile device associated with user, wherein the processor-based device outputs the machine readable item to at least one reader device associated with a product dispenser.

In some embodiments, the method can further include receiving data for at least one ratio associated with the plurality of product recipes; wherein the combined recipe comprises the at least one ratio associated with the plurality of product recipes; and normalizing the at least one ratio associated with the plurality of product recipes if a combined ratio is not equal to a predefined total ratio; wherein the combined recipe can include at least one normalized ratio associated with the plurality of product recipes.

In some embodiments, the generating the machine readable item can include at least one of the following: storing encoded data, printing encoded data, displaying encoded data, electronically transmitting encoded data for printing or displaying by a user, or outputting encoded data.

In some embodiments, a method can further include validating the promotion identifier or combined recipe against at least one predefined rule comprising at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In yet another embodiment, a method for providing a product for providing a promotion for a combined product dispensed from a product dispenser can be provided. The method can include receiving data associated with a plurality of product recipes; and generating a machine readable item with a promotion identifier, and a combined recipe comprising the plurality of product recipes, wherein the machine readable item configures a product dispenser to promote and dispense the combined recipe.

In some embodiments, a method can further include receiving data for at least one ratio associated with the plurality of product recipes; wherein the combined recipe comprises the at least one ratio associated with the plurality of product recipes.

In some embodiments, a method can further include normalizing the at least a ratio associated with the plurality of product recipes if a combined ratio is not equal to a predefined total ratio; wherein the combined recipe comprises at least one normalized ratio associated with the plurality of product recipes.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, generating the machine readable item can include at least one of the following: storing encoded data, printing encoded data, displaying encoded data, electronically transmitting encoded data for printing or displaying by a user, or outputting encoded data.

In some embodiments, a method can further include validating the promotion identifier or combined recipe against at least one predefined rule.

In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

In some embodiments, a method can further include transmitting the machine readable item to a processor-based device associated with a user, wherein the processor-based device outputs the machine readable item to at least one reader device associated with a product dispenser.

Additional systems, methods, computer program products, product dispensers, apparatus, aspects, and features can be realized through the techniques of various embodiments of the invention. Other embodiments, aspects, and features of the invention are described in detail herein and are considered a part of the claimed inventions. Other embodiments, aspects, and features can be understood with reference to the description and to the drawings.

BRIEF DESCRIPTION OF THE FIGURES

FIG. 3 is an example machine readable item in accordance with an embodiment of the invention.

FIG. 4 is another example machine readable item in accordance with an embodiment of the invention.

FIG. 5 is a schematic view of an example user interface for use with a product dispenser in accordance with an embodiment of the invention.

The detailed description explains various embodiments of the invention, together with aspects and features, by way of example with reference to the drawings, in which like numerals indicate like elements throughout the several views.

DETAILED DESCRIPTION OF EMBODIMENTS OF THE INVENTION

Figure 1:
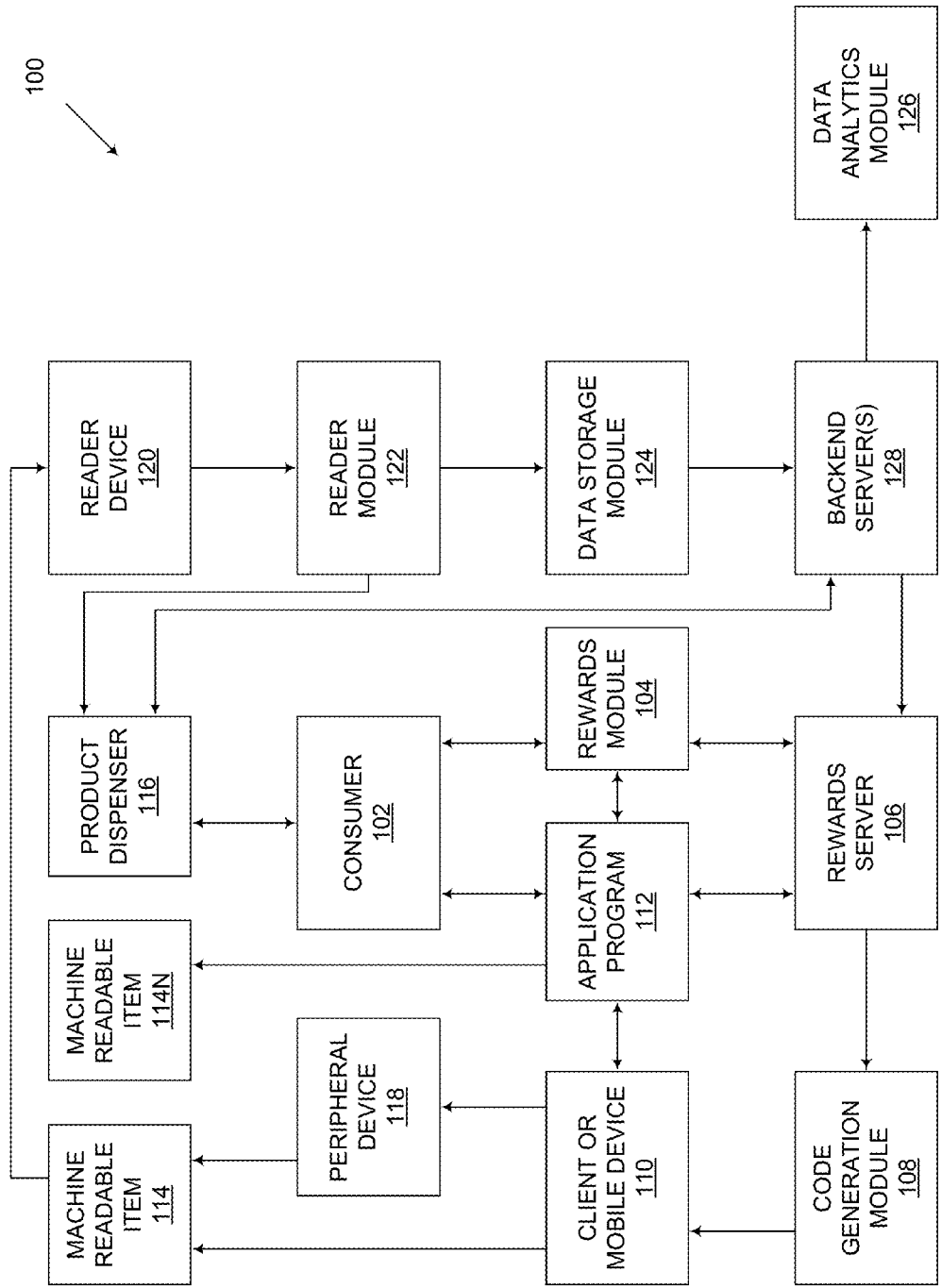
FIG. 1 is a schematic view of an example data flow between various entities and example system components in accordance with an embodiment of the invention.

As used herein, the terms "beverage forming dispenser," "product dispenser," "beverage dispenser," "dispenser apparatus," and "dispenser" refer to a device which dispenses a product such as a beverage, a fluid, or a consumable product. Example dispensers according to certain embodiments can include, but are not limited to, fountain dispensers, liquid or fluidized material dispensers, BIB or "bag-in-box"-type dispensers, micro-ingredient dispensers, and post-mix beverage dispensers.

As used herein, the term "product" and its pluralized form, are used synonymously, and embodiments of the invention should not be limited in scope by the use of either a singular or pluralized term.

As used herein, the term "beverage" and its pluralized form are used synonymously, and embodiments of the invention should not be limited in scope by the use of either a singular term or its pluralized form.

As used herein, the term "recipe" refers to one or more ingredients (macro-ingredient and/or micro-ingredient) and/or components used to form a product, a consumable product, a beverage, a finished product, branded product or non-branded product, or other predefined product or beverage.

As used herein, the term "module" refers to an application program, set of computer-executable instructions, or computer program product operable to be implemented by one or more computer processors.

Embodiments of the invention can include systems and methods to enable a consumer to configure a product dispenser to promote and dispense a combined recipe of different combinations of products offered at the product dispenser. In some embodiments the product dispenser is a beverage dispenser and the products are branded and/or non-branded beverages. For example, the product dispenser may be configured to dispense a combination of VANILLA COCA-COLA™ and BARQ'S™ Root Beer. In one instance, a consumer or user can configure the product dispenser using a combined recipe encoded in a machine readable item. In another instance, the consumer can configure the product dispenser using locally stored or network available combined recipe information accessible or deliverable to the product dispenser. Further, a user interface of the product dispenser can be customized for a particular consumer desiring to dispense a combined recipe of products offered at the product dispenser. Thus, certain embodiments of the invention can provide technical solutions to the problem of limited product selections at conventional product dispensers. Further, certain embodiments of the invention can provide technical solutions to the problem of mixing unsuitable combinations of products together at conventional product dispensers. Certain embodiments of the invention can include systems and methods for providing a promotion for a combined product from a product dispenser. Certain embodiments of the invention can include systems and methods for configuring a product dispenser to promote and dispense a combined recipe. Certain embodiments of the invention can be particularly useful when operating a product dispenser, such as a beverage dispenser.

In some embodiments, a customer can print a machine readable item, such as a QR code, or otherwise obtain a machine readable item on a mobile device via email or an application program, wherein the machine readable item includes an encoded combined recipe. In one instance, a consumer can select a predefined combined recipe from an application program and obtain a corresponding machine readable item with the encoded combined recipe. In another instance, a consumer can create a combined recipe using an application program, and the combined recipe can be encoded in a machine readable item. In either instance, the machine readable item can be transmitted to the consumer to configure a product dispenser to dispense the combined recipe.

Turning now to the drawings in greater detail, FIG. 1 is an example data flow between various entities and example system components in accordance with an embodiment of the invention. In the data flow 100 of FIG. 1, a consumer 102 can interact with a rewards module 104 operating in conjunction with a rewards server 106 and a code generation module 108. For example, the consumer 102 may interact with a rewards module 104 hosted on the rewards server 106 using a client or mobile device 110. A client or mobile device 110 can include, but is not limited to a processor-based device, a smart phone, a mobile phone, a personal computer, a laptop computer, a handheld computer, a tablet, or other computer-type device. The consumer 102 may enter one or more inputs or data to the rewards module 104 via the client or mobile device 110 to create or otherwise obtain a desired or custom product recipe, also known as a combined recipe. In addition to the one or more inputs or data, the rewards module 104 can receive or otherwise obtain stored data, either stored remotely or locally stored at the client or mobile device 110, associated with the consumer 102, such as consumer preferences, identification information, financial information, and other information associated with the consumer 102.

In some embodiments, the rewards module 104 can utilize an application program 112 that enables the consumer 102 to create a combined recipe. For example, an application program 112 may be coded as part of the rewards module 104, an application program 112 may be hosted on the same server as the rewards module 104, an application program 112 may be hosted on a separate server from the rewards module 104, an application program may be hosted on a product dispenser 116, or an application program 112 may be in communication with the rewards module 104, both of which may be located or otherwise stored on one or more processor-based devices. In another example, an application program 112 may be an administrative-type application program for creating or uploading pre-defined combination recipes that may be obtained by the consumer 102. In yet another example, an application program 112 may include code or functionality to permit a consumer 102 to create his or her own unique product recipe for use in a combined recipe. In any instance, the application program 112 can receive selections of a plurality of product recipes to combine into a combined recipe. In certain embodiments, the application program 112 may also receive a selection of a ratio associated with each of the selected product recipes of the combined recipe.

For example, a consumer can select a first product recipe associated with VANILLA COCA-COLA™ and a second product recipe associated with BARQ'S™ Root Beer to combine into a combined recipe. By way of another example, a consumer may also select a ratio, such as 25%, associated with the first product recipe for VANILLA COCA-COLA™ and select a ratio, such as 75%, associated with the second product recipe for BARQ'S™ Root Beer, wherein the combined recipe includes the ratio associated with the first product recipe and the ratio associated with the second product recipe. In another example, a ratio, such as 25%, associated with the first product recipe for VANILLA COCA-COLA™ and a ratio, such as 25%, associated with the second product recipe for BARQ'S™ Root Beer can be normalized to 50% for both ratios by the rewards module 104, rewards server 106, application program 112, or other component if a combined ratio is not equal to a predefined total ratio, such as 100%. Thus, in any instance, the consumer 102 can create a combined recipe using various ratios of two or more existing product recipes.

In some embodiments, one or more existing or predefined product recipes for branded products, such as VANILLA COCA-COLA™ or BARQ'S™ Root Beer, can be used to create a combined recipe. In other embodiments, one or more existing or predefined product recipes for non-branded products can be used to create a combined recipe. In yet other embodiments, one or more newly created product recipes, such as a unique recipe created by a consumer 102 using an application program, such as 112, can be used to create a combined recipe.

In certain embodiments, a sum of the ratios assigned to the product recipes in a combined recipe may not be equal to a predefined total ratio, such as the integer "1" or 100%. Accordingly, the ratios in the combined recipe may be normalized such that their sum is equal to the predefined total ratio. In some embodiments, an error message may be presented or the consumer 102 may otherwise be notified of his or her error, and the ratios may automatically be adjusted or the consumer 102 may be requested to adjust the assigned ratios accordingly.

In certain embodiments, the application program 112 can include functionality to validate a combined recipe prior to permitting the consumer 102 to use the combined recipe to configure a product dispenser 116. One or more predefined rules may be applied by the application program 112 to validate the combined recipe. A suitable predefined rule can include, but is not limited to, availability of an ingredient at a product dispenser, a limit on an amount of at least one ingredient in the combined recipe, a limit on an amount of at least one type of ingredient in the combined recipe, or a restriction on a combination of at least two ingredients. In one example, a validation process implemented by the application program 112 using at least one predefined rule can determine whether the product dispenser 116 has available a combination of product recipes and/or product ingredients to dispense a combined recipe. If the combination of product recipes and/or product ingredients does not exist or is unavailable at the product dispenser 116 to dispense the combined recipe, the application program 112 may indicate the combined recipe cannot be used, and may suggest to the consumer another product recipe or combined recipe. Alternatively or additionally, the application program 112 or product dispenser 116 may direct the consumer to another location where the combination of product recipes and/or product ingredients is available. In yet another example, a predefined rule for a limit on an amount of at least one ingredient in the combined recipe can restrict a combined recipe having more than caffeine predefined quantity of a particular ingredient. By way of another example, a predefined rule for a limit on an amount of at least one type of ingredient in the combined recipe can restrict selection of stimulant-type ingredients that combine to be more than a predefined quantity of stimulants. By way of another example, a predefined rule for a restriction on a combination of at least two ingredients can restrict combining two ingredients known to not taste well together or otherwise not meet a suitable taste profile. By way of another example, a predefined rule for a restriction on a combination of two ingredients can restrict combining two ingredients known to react or otherwise interact in an undesirable manner (e.g., produce an excessive amount of foam, alter the mouth feel of the beverage in an undesirable way, etc.).

In some embodiments, validation of a combined recipe can occur at the product dispenser 116 or by a backend server, such as 128, operating in conjunction with the product dispenser 116. In either instance, one or more predefined rules may be applied by the product dispenser 116 or by the backend server 128 to validate the combined recipe.

In certain embodiments, any number of combined recipes can be stored and made available for automatic selection by a processor or for user selection by the consumer 102. Thus, a combined recipe can be automatically selected for the consumer 102 based at least in part on any number of factors, such as consumer preferences, location, demographic, recommendation, crowdsourcing, etc. Additionally, a combined recipe can be user selected or automatically selected based on selection by a promotion administrator, such as for a "Drink of the Day" promotion.

Using information associated with the combined recipe, the rewards module 104 can communicate with the code generation module 108 hosted on the rewards server 106 to facilitate generation of a machine readable item 114. The code generation module 108 can utilize data received from the rewards module to generate the machine readable item 114. The machine readable item 114 can be, for example, a bar code, a 2D bar code, a QR code, a RFID tag, a NFC chip, a data matrix, an alphanumeric string, a character string, a short message service or text message, or other encoded data. In some embodiments, the data encoded in the machine readable item 114 may be encrypted. Some or all of the data received from the rewards module 104 can be encrypted by the rewards module 104, rewards server 106 and/or the code generation module 108. In any instance, the machine readable item 114 can include data operable to configure a product dispenser 116 to dispense a product using a combined recipe.

In some embodiments, the rewards module 104 and code generation module 108 may be hosted on the product dispenser 116, wherein the product dispenser 116 may function as a server or host for the functionality described above with respect to the rewards module 104 and code generation module 108.

In some embodiments, the code generation module 108 may be coded as part of the rewards module 104, the code generation module 108 may be hosted on the same server as the rewards module 104, or the code generation module 108 may be in communication with the rewards module 104, both of which may be located or otherwise stored on the same processor-based device or more than one processor-based device.

In the embodiment shown in FIG. 1, the machine readable item 114 can be output to the client or mobile device 110, or to a peripheral device 118 associated with the client or mobile device 110. For example, the code generation module 108 can generate a machine readable item 114, and transmit the machine readable item 114 to the client or mobile device 110, where the machine readable item 114 can be output on a display device or screen associated with the client or mobile device 110. In another example, the code generation module 108 can generate a machine readable item 114, and transmit the machine readable item 114 to the client or mobile device 110, where the machine readable item 114 can be printed on a peripheral device 118, such as a printer, associated with the client or mobile device 110. In any instance, the consumer 102 can present the machine readable item 114 at a product dispenser 116.

As shown in FIG. 1, the consumer 102 can utilize the machine readable item 114 at a product dispenser 116 associated with a reader device 120 and reader module 122. In some embodiments, the reader module 122 can be hosted by the product dispenser 116 or may be remotely hosted on a server, such as the rewards server 106, or other processor-based device. When the machine readable item 114 is scanned, read by, transmitted to, or otherwise input to the reader device 120, the reader device 120 can receive the data encoded by the machine readable item 114. The reader device 120 can then communicate the data encoded by the machine readable item 114 with the reader module 122 to obtain data operable to configure the product dispenser 116 to dispense a product using the combined recipe. In some embodiments, the reader module 122 can facilitate providing a sensory feedback, such as an audible beep, to let the consumer 102 know the machine readable item 114 has been read or otherwise accepted. The reader device 120 and/or the reader module 122 can decode, decrypt, or otherwise obtain the combined recipe from the machine readable item 114, which can be used to configure the product dispenser 116 to dispense a product using the combined recipe. For example, the machine readable item 114 can configure the product dispenser 116 to dispense a a combination of existing product recipes available at the product dispenser in ratios specified by the combined recipe encoded therein.

In some embodiments, the consumer 102 may present the machine readable item 114 at the product dispenser 116 to be input to the reader device 120 and/or reader module 122. The product dispenser 116 may prompt the consumer 102 to input certain data via a user interface, such as ratios for one or more product recipes encoded by the machine readable item 114. In certain embodiments, the product dispenser 116 could normalize the consumer input ratios in the combined recipe such that their sum is equal to a predefined total ratio, similar to that described above. Using the consumer input ratios and the one or more product recipes encoded by the machine readable item 114, the product dispenser 116 can be configured to dispense a product using a combined recipe.

In some embodiments, the consumer 102 may present the machine readable item 114 at the product dispenser 116 to be input to the reader device 120 and/or reader module 122. The product dispenser 116 may automatically select ratios for one or more product recipes encoded by the machine readable item 114. For example, if three product recipes are encoded by the machine readable item 114, the product dispenser 116 could default to even ratios among the three product recipes, such as 33.3% for all 3 ratios. In any instance, using the one or more product recipes encoded by the machine readable item 114 and the automatically selected ratios for one or more product recipes, the product dispenser 116 can be configured to dispense a product using a combined recipe.

In some embodiments, a local machine readable item, such as 114N, may be used to configure a product dispenser 116 to dispense a product using a combined recipe. For example, a local machine readable item 114N, for example, a QR code, may be present or otherwise accessible at the product dispenser 116. The local machine readable item 114N may be output via a user interface associated with the product dispenser 116, or may be displayed on a decal embossed, painted, or imprinted on or affixed or adhered to the product dispenser 116. In either instance, the consumer 102 may utilize the client or mobile device 110, or a portable reader device to scan, read, or otherwise input the local machine readable item 114N. In some embodiments, the client or mobile device 110 may communicate with another application program hosted remotely from the client or mobile device 110, either on a server or the product dispenser 116, to scan, read, or otherwise input the local machine readable item 114N. In any instance, client or mobile device 110 may use data encoded on the local machine readable item 114N to communicate with the application program 112, the rewards server 106, or the rewards module 104 to obtain a machine readable item, such as 114, operable to configure the product dispenser 116 to dispense a product using the combined recipe. For instance, the data encoded on the local machine readable item 114N may be an unlock code, alphanumeric string, character string, or another machine readable item that can be input to the product dispenser 116 via an associated user interface and/or the reader device 120. In another example, scanning, reading, or otherwise inputting the local machine readable item 114N may direct the client or mobile device 110 to a webpage hosted by a remote server or the product dispenser 116, wherein the webpage contains a an unlock code, alphanumeric string, character string, or another machine readable item that can be input to the product dispenser 116 via an associated user interface and/or the reader device 120. In any instance, upon receipt of the unlock code, alphanumeric string, character string, or another machine readable item, the reader device 120 can communicate with the reader module 122 to decode, decrypt, or otherwise obtain a combined recipe from the unlock code, alphanumeric string, character string, or other machine readable item, which can be used to configure the product dispenser 116 to dispense a product using the combined recipe.

In some embodiments, the consumer 102 utilizing the client or mobile device 110 operating an application with augmented reality code or functionality, can reveal via the local machine readable item 114N an unlock code, alphanumeric string, character string, or an machine readable item, similar to 114, which may be used to configure the product dispenser 116 to dispense a product using a combined recipe. For example, a consumer may utilize the client or mobile device 110 to execute the application with augmented reality code or functionality, which may operate in conjunction with a peripheral device of the client or mobile device 110, such a camera. When the consumer 102 views a certain environment or scene, such as the local machine readable item 114N, through the peripheral device or camera, the augmented reality application can overlay a virtual environment or scene on a display screen associated with the client or mobile device 110. Within the virtual environment or scene, an unlock code, alphanumeric string, character string, or an machine readable item, similar to 114, may be revealed or displayed that can be input to the product dispenser 116 via an associated user interface or reader device 120. In some embodiments, the augmented reality application may communicate with another application program hosted remotely from the client or mobile device 110, either on a server or the product dispenser 116, to reveal an unlock code, alphanumeric string, character string, or an machine readable item, similar to 114, which may be used to configure the product dispenser 116 to dispense a product using a combined recipe. In any instance, upon receipt of the unlock code, alphanumeric string, character string, or an machine readable item, similar to 114, the reader device 120 can communicate with the reader module 122 to decode, decrypt, or otherwise obtain a combined recipe from the unlock code, alphanumeric string, character string, or an machine readable item, similar to 114, which can be used to configure the product dispenser 116 to dispense a product using the combined recipe.

In the embodiment shown in FIG. 1, the reader module 122 can include functionality to validate and/or authenticate a machine readable item, such as 114, that is input to the reader device 120 to configure the product dispenser 116 to promote and/or dispense a combined recipe. In some embodiments, the reader module 122 may communicate with another application program hosted remotely from the reader module 122, such as on rewards server 106, rewards module 104, or application program 112, to validate and/or authenticate the machine readable item 114 that is input to the reader device 120 to configure the product dispenser 116 to promote and/or dispense a combined recipe. One or more predefined rules may be applied by the reader module 122, other application program, and/or the product dispenser 116 to validate and/or authenticate the machine readable item 114. In one example, a validation and/or authentication process implemented using at least one predefined rule can determine whether the product dispenser 116 has available a combination of product recipes and/or product ingredients to dispense a combined recipe encoded by the machine readable item 114. If the combination of product recipes and/or product ingredients does not exist or is unavailable at the product dispenser 116 to dispense the combined recipe, the product dispenser 116 may be configured to indicate the machine readable item 114 cannot be used, and may suggest to the consumer another location or product dispenser that has the combination of product recipes and/or product ingredients. In some embodiments, if the combination of product recipes and/or product ingredients does not exist or is unavailable at the product dispenser 116 to dispense the combined recipe, the product dispenser 116 may be configured to limit the use of available product recipes and/or product ingredients to dispense a combined recipe. For example, if a combination of two product recipes is requested for dispensing a combined recipe at a product dispenser, and the product dispenser is low or out of one of the product recipes or one of an ingredient for one of the product recipes, the product dispenser may recognize the low level or deficient ingredient. The product dispenser may suggest to the consumer a different product recipe and/or ingredient to use for a combined recipe, wherein a sufficient or suitable amount or level of the product recipe and/or ingredient exists at the product dispenser.

In yet another example, a validation and/or authentication process implemented by the reader module 122, other application program, and/or product dispenser 116 using at least one predefined rule can determine if the machine readable item 114 is associated with a predefined promotion or promotional offer provided by the product dispenser 116. If the predefined promotion or promotional offer has ended or is not available at the product dispenser 116 to dispense the combined recipe, the product dispenser 116 may be configured to indicate the machine readable item 114 cannot be used, and may suggest to the consumer another location or product dispenser. In yet another example, a validation and/or authentication process implemented by the reader module 122, other application program, and/or product dispenser 116 using at least one predefined rule can determine if the machine readable item 114 is an item to read at a particular location or set of locations, such as certain franchise of retail stores or a certain geographic location. If the machine readable item cannot be used at the product dispenser 116 to dispense the combined recipe, the product dispenser 116 may be configured to indicate the machine readable item 114 cannot be used, and may suggest to the consumer another location or product dispenser.

Also shown in the embodiment of FIG. 1, at least one data storage module 124, data analytics module 126, and one or more backend servers 128 can be in communication with the reader module 122, product dispenser 116, the rewards module 104 and/or the rewards server 106 to facilitate storage and subsequent processing of information associated with a machine readable item 114 and a dispensed product.

For example, a data storage module 124 can receive and store information from the reader module 122 and/or product dispenser 116 during or after reading of the machine readable item 114 by the reader device 120. The information can include, but is not limited to, product dispenser location, time and/or date of a dispensed combined recipe, the combined recipe, promotion identification code or number, an allocation of rewards or loyalty program points, volume of a dispensed combined recipe, information associated with or identifying a consumer to whom a machine readable code was provided to, information associated with or identifying the consumer 102 to whom a product was dispensed to, and any other information associated with a loyalty and/or product promotion program. In some embodiments, the rewards server 106 can administer or otherwise store award or point allocations or calculations based on certain information, such as quantity of or location of a dispensed combined recipe. The rewards server 106 may also be configured to generate one or more reports on promotion performance, and may provide suggestions or optimizations to improve promotion performance. One or more backend servers, such as 128, can receive the stored information and transmit some or all of the information to a data analytics module 126, which can provide one or more reports, product inventory, and product dispenser usage. In some embodiments, information and/or data collected by or otherwise received by the reader device 120, the reader module 122, and the data storage module 124 can be stored locally at the product dispenser 116 and/or at a remote server, such as one or more backend servers 128. One or more backend servers, such as 128, can also provide certain information to the rewards module 104 and/or the rewards server 106 as needed to administer a promotional and/or loyalty program.

Also shown in the embodiment of FIG. 1, a data analytics module 126 and one or more backend servers 128 can be in communication with the reader module 122, product dispenser 116, the rewards module 104 and/or the rewards server 106 to facilitate storage and subsequent processing of information associated with a machine readable item 114 and a dispensed product. For example, a data analytics module 126 and/or one or more backend servers 128 can receive and store information from the reader module 122 and/or product dispenser 116 during or after reading of the machine readable item 114 by the reader device 120. The information can include, but is not limited to, product dispenser location, time and/or date of a dispensed combined recipe, the combined recipe, promotion identification code or number, an allocation of rewards or loyalty program points, volume of a dispensed combined recipe, information associated with or identifying a consumer to whom a machine readable code was provided to, information associated with or identifying the consumer 102 to whom a product was dispensed to, and any other information associated with a loyalty and/or product promotion program. The one or more backend servers, such as 128, can receive the stored information and transmit some or all of the information to the data analytics module 126, which can provide one or more reports on promotion performance, product inventory, and product dispenser usage. In some embodiments, information and/or data collected by or otherwise received by the reader device 120 and the reader module 122 can be stored locally at the product dispenser and/or at a remote server, such as one or more backend servers 128. One or more backend servers, such as 128, can also provide certain information to the rewards module 104 and/or the rewards server 106 as needed to administer a promotional and/or loyalty program.

Figure 2:
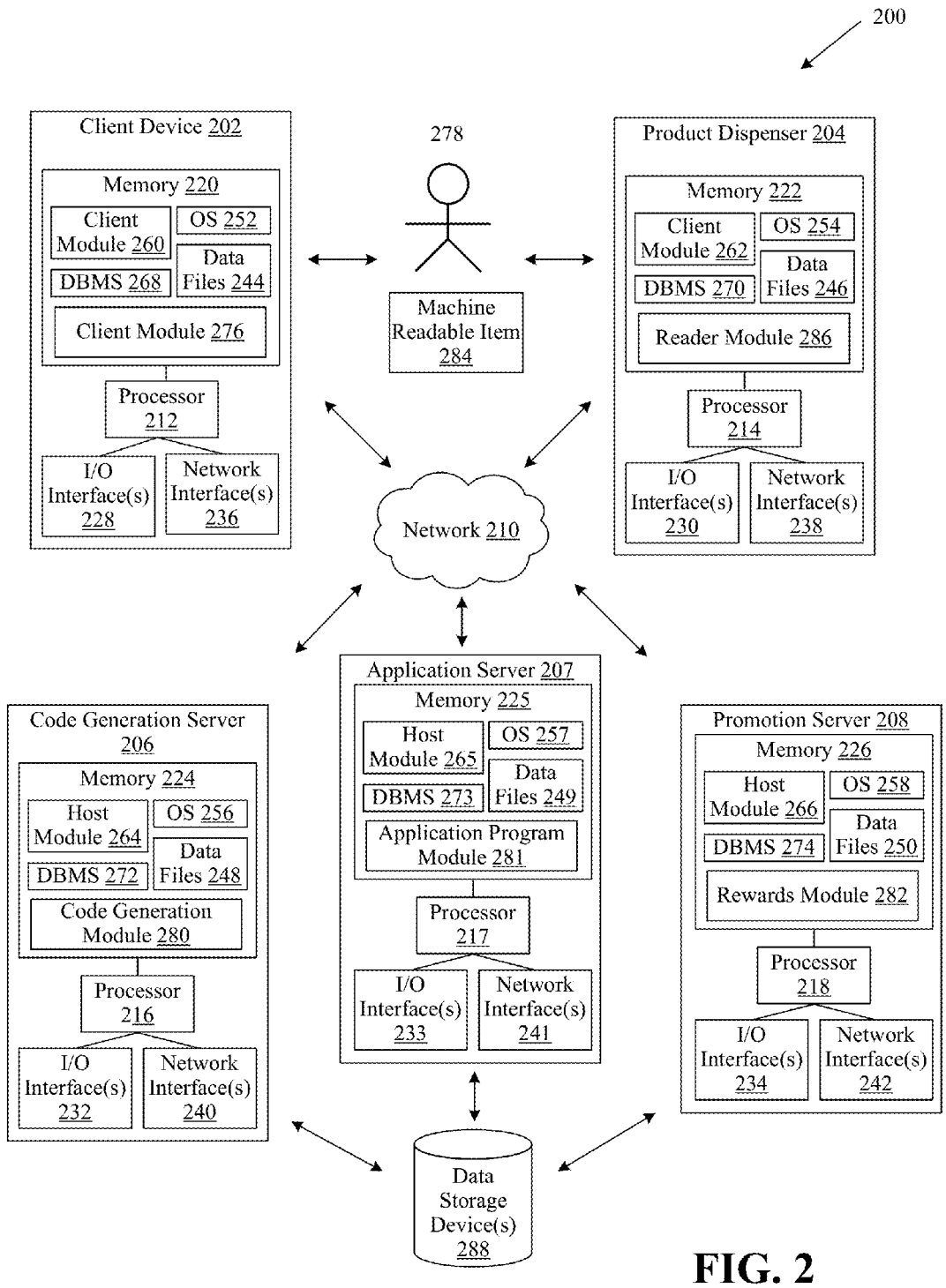
FIG. 2 is an example system in accordance with an embodiment of the invention.

Turning to FIG. 2, an example system 200 for providing a product for dispensing from a product dispenser is illustrated according to an embodiment of the invention. In certain embodiments, the example system 200 can be operable to provide a machine readable item for configuring a product dispenser to dispense a product using a combined recipe. In the embodiment shown in FIG. 2, a client device 202, a product dispenser 204, a code generation server 206, an application server 207, and promotion server 208 may all communicate with each other via at least one network 210. Each of the client device 202, product dispenser 204, code generation server 206, application server 207, and promotion server 208 may be one or more processor-driven devices, such as, but not limited to, a mobile device, a smart phone, a mobile phone, a tablet, a server computer, a personal computer, a laptop computer, a handheld computer, a networked product or beverage dispenser, and the like. The network 210 shown can link the client device 202, the product dispenser 204, the code generation server 206, application server 207, and the promotion server 208 together, wherein the network can include one or more wired or wireless networks. In addition to having one or more processors 212, 214, 216, 217, 218, the client device 202, product dispenser 204, code generation server 206, application server 207, and promotion server 208 may each further include one or more memories 220, 222, 224, 225, 226, one or more input/output (I/O) interfaces 228, 230, 232, 233, 234, and one or more network interfaces 236, 238, 240, 241, 242, respectively. The memories 220, 222, 224, 225, 226 may store data files 244, 246, 248, 249, 250 and various program modules, such as an operating system (OS) 252, 254, 256, 257, 258, a client and/or host module 260, 262, 264, 265, 266, and a database management system (DBMS) 268, 270, 272, 273, 274 for accessing one or more databases, respectively. The I/O interfaces 228, 230, 232, 233, 234 may facilitate communication between the processors 212, 214, 216, 217, 218, respectively, and various I/O devices, such as a camera, range finder, laser range finder, bar code reader/scanner, RFID reader, machine readable item reader, scanner, keyboard, mouse, printer, microphone, speaker, monitor, display screen, touch screen, and the like. The network interfaces 236, 238, 240, 241, 242 each may take any of a number of forms, such as a network interface card, a modem, a wireless network card, and the like.

With reference to the client device 202, which may be or include a mobile device or personal computer, the client module 276 may be an Internet browser or other software, such as an application program or app, for interacting with the product dispenser 204, code generation server 206, application server 207, and/or promotion server 208. For example, a user 278, such as a consumer, may utilize the client module 276 to create a new recipe, create a combined recipe, or obtain a pre-stored combined recipe via the code generation server 206, application server 207, and/or the promotion server 208. In some embodiments, the client module 276 can interact with the application program module 281 of the application server 207 to perform one or more of the functions associated with the client module 276. In some embodiments, some or all of the functionality of the client module 276 can be performed by the application program module 281 of the application server 207.

The client module 276 and/or the application program module 281 may include computer-executable instructions operable to receive data associated with a plurality of product recipes. The client module and/or the application program module may also include computer-executable instructions operable to facilitate generating a machine readable item with a combined recipe comprising the plurality of product recipes, wherein the machine readable item configures a product dispenser to dispense the combined recipe. For purposes of clarity, the term "plurality of product recipes" used herein can refer to a first product recipe and a second product recipe, or could refer to more than two product recipes.

In some embodiments, the client module 276 and/or the application program module 281 may include computer-executable instructions operable to receive data for at least one ratio associated with the plurality of product recipes; wherein the combined recipe comprises the at least one ratio associated with the plurality of product recipes. For purposes of clarity, the term "at least one ratio associated with the plurality of product recipes" used herein can refer to a ratio associated with a first product recipe and a ratio associated with a second product recipe, or could refer to respective ratios each associated with a product recipe.

In some embodiments the client module 276 and/or the application program module 281 may include computer-executable instructions operable to normalize the at least one ratio associated with the plurality of product recipes if a combined ratio is not equal to a predefined total ratio; wherein the combined recipe comprises at least one normalized ratio associated with the plurality of product recipes. For purposes of clarity, the term "at least one normalized ratio associated with the plurality of product recipes" used herein can refer to a normalized ratio associated with a first product recipe and a normalized ratio associated with a second product recipe, or could refer to a respective normalized ratios each associated with a product recipe.

In some embodiments, the client module 276 and/or the application program module 281 may include computer-executable instructions operable to validate the combined recipe against at least one predefined rule comprising at least one of the following: a limit on an amount of at least one ingredient in the combined recipe, a limit on an amount of at least one type of ingredient in the combined recipe, or a restriction on a combination of at least two ingredients.

At the code generation server 206, application server 207, and/or promotion server 208, one or more inputs or data can be received from the user 278 via the code generation module 280, application program module 281, and/or rewards module 282 to select at least a first product recipe and at least a second product recipe.

In some embodiments, the code generation server 206, application server 207, and/or promotion server 208 may receive one or more inputs or data from the user 278 via the code generation module 280 and/or rewards module 282 to select a ratio associated with the plurality of product recipes. In some embodiments, more than two product recipes and corresponding ratios can be selected. In addition, the code generation server 206, application server 207, and/or promotion server 208 and their respective associated DBMS 272, 273, 274 may be operable to access one or more databases, data files 248, 249, 250, or other data storage devices, such as 288, for storing and/or retrieving previously stored recipes as well as other consumer associated information, which may include, but is not limited to, consumer preferences, identification information, and financial information. In some embodiments, a combined recipe can be automatically selected by the code generation server 206, application server 207, and/or promotion server 208 for a consumer such as 278 based at least in part on any number of factors, such as consumer preferences, location, demographic, recommendation, crowdsourcing, etc. In another embodiment, a combined recipe can be selected by the code generation server 206, application server 207, and/or promotion server 208 based on selection by a promotion administrator, such as for a "Drink of the Day" promotion.

In any instance, the code generation server 206, application server 207, and/or promotion server 208 can generate a combined recipe based at least in part on a plurality of product recipes. In some embodiments, the code generation server 206, application server 207, and/or promotion server 208 can normalize at least one ratio associated with the plurality of product recipes if a combined ratio is not equal to a predefined total ratio, wherein the combined recipe comprises at least one normalized ratio associated with the plurality of product recipes. In some embodiments, a code generation server 206, application server 207, and/or promotion server 208 can validate the combined recipe against at least one predefined rule. A suitable predefined rule can include, but is not limited to, a limit on an amount of at least one ingredient in the combined recipe, a limit on an amount of at least one type of ingredient in the combined recipe, or a restriction on a combination of at least two ingredients. For example, a predefined rule for a limit on an amount of at least one ingredient in the combined recipe can be a restriction on with the combined recipe having more than caffeine predefined quantity of a particular ingredient. By way of another example, a predefined rule for a limit on an amount of at least one type of ingredient in the combined recipe can be a restriction on selecting stimulant-type ingredients that combine to be more than a predefined quantity of stimulants. By way of another example, a predefined rule for a restriction on a combination of at least two ingredients can be a restriction on combining two ingredients known to not taste well together or otherwise not meet a suitable taste profile. By way of another example, a predefined rule for a restriction on a combination of two ingredients can be a restriction on combining two ingredients known to react or otherwise interact in an undesirable manner (e.g., produce an excessive amount of foam, alter the mouth feel of the beverage in an undesirable way, etc.).

In any instance, when the combined recipe has been created, the code generation server 206 can generate a machine readable item 284 with a combined recipe comprising at least a plurality of product recipes, wherein the machine readable item 284 configures a product dispenser to dispense the combined recipe. A suitable machine readable item can include, but is not limited to, a bar code, a 2D bar code, a QR code, a RFID tag, a NFC chip, a data matrix, an alphanumeric string, a character string, a short message service or text message, encoded data, or encrypted data. One example machine readable item is shown and described with respect to FIG. 4. Upon or after generating the machine readable item 284, the code generation server 206 can facilitate storing encoded data, printing encoded data, displaying encoded data, electronically transmitting encoded data for printing or displaying by a user, or outputting encoded data.

As described in more detail herein, the code generation module 280, application program module 281, and/or rewards module 282 may include computer-executable instructions operable to receive data associated with a plurality of product recipes. The code generation module 280, application program module 281, and/or rewards module 282 may also include computer-executable instructions operable to facilitate generating a machine readable item with a combined recipe comprising the plurality of product recipes, wherein the machine readable item configures a product dispenser to dispense the combined recipe.

In some embodiments, the code generation module 280, application program module 281, and/or rewards module 282 may include computer-executable instructions operable to receive data for at least one ratio associated with the plurality of product recipes; wherein the combined recipe comprises the at least one ratio associated with the plurality of product recipes.

In some embodiments, the code generation module 280, application program module 281, and/or rewards module 282 may include computer-executable instructions operable to normalize at least one ratio associated with the plurality of product recipes if a combined ratio is not equal to a predefined total ratio; wherein the combined recipe comprises at least one normalized ratio associated with the plurality of product recipes.

In some embodiments, the code generation module 280, application program module 281, and/or rewards module 282 may include computer-executable instructions operable to validate the combined recipe against at least one predefined rule comprising at least one of the following: a limit on an amount of at least one ingredient in the combined recipe, a limit on an amount of at least one type of ingredient in the combined recipe, or a restriction on a combination of at least two ingredients.

Typically, the code generation module 280 of the code generation server 206, the application program module 281 of the application server 207, and/or the rewards module 282 of the promotion server 208 can transmit the machine readable item 284 to the user 278 via the network 210 and the client device 202. The user 278 may store, print, display, or otherwise receive for storage, printing, or display, the machine readable item 280 depending on the user's preference and/or the format the code generation server 206, application server 207, and/or promotion server 208 transmits the machine readable item 284. The client device 202 and its associated memory 220 may store the machine readable item 284 until the user 278 is ready to use the machine readable item 284. According to some embodiments, a QR code can be generated and transmitted by the code generation server 206 to the client device 202 for use by the user 278. The user 278 may view the QR code via an associated display screen or device. When the user 278 is ready to use the machine readable item 284, such as a QR code, the user 278 can present the machine readable item 284 in proximity to a product dispenser 204. In some embodiments, the machine readable item 284 can be transmitted to or otherwise input to the product dispenser 204, such as by WiFi or Bluetooth transmission.

The product dispenser 204 may receive the machine readable item 284 via the reader module 286 by reading, scanning, or otherwise obtaining the machine readable item 284. For example, an associated camera can read a machine readable item 284, such as a QR code, and the reader module 286 can decode, and in certain instances, decrypt, the machine readable item 284 to obtain the combined recipe and any other associated information. In some embodiments, the reader module 286 can facilitate providing a sensory feedback, such as an audible beep, to let the consumer 278 know the machine readable item 284 has been read or otherwise accepted. The reader module 286 can utilize the combined recipe to configure the product dispenser 204 to dispense a product with the combined recipe. In some instances, ratios associated with one or more product recipes can be used by the reader module 286 to configure the product dispenser 204 to dispense a product with the combined recipe having certain ratios of one or more product recipes. Further, other associated information in the machine readable item 284 may be used by the reader module 286 to configure the user interface of the product dispenser 204. For example, a user interface associated with the product dispenser 204 can be configured with one or more product selection buttons, graphics, images, messages, text, or other content stored locally at the product dispenser 204, stored on a network accessible device or data storage device, such as 288, or stored within the machine readable item 284. In some embodiments, the machine readable item 284 can include a graphic identifier, a background image identifier, and a message identifier and/or text which the reader module 286 can configure the product dispenser 204 to generate or otherwise modify a user interface for display or output to the user 278 after the machine readable item 284 is received. Example information for use in a machine readable item are shown in FIG. 3. An example user interface for the product dispenser 204 is shown and described in FIG. 5.

As described in more detail herein, the reader module 286 may include computer-executable instructions operable to receive information from a machine readable item. The machine readable item can include data associated with a plurality of product recipes, wherein the plurality of product recipes comprise a combined recipe. The reader module 286 may further include computer-executable instructions operable to dispense a product using the combined recipe. In some embodiments, the reader module 386 may include computer-executable instructions operable to normalize at least one ratio associated with the plurality of product recipes if a combined ratio is not equal to a predefined total ratio, wherein the combined recipe comprises at least one normalized ratio associated with the plurality of product recipes. In some embodiments, the reader module 386 may include computer-executable instructions operable to receive encoded data, receive printed encoded data, receive displayed encoded data, receive a QR code from a mobile device, receive a printed QR code, or electronically receive encoded data. In another embodiment, the reader module 286 may include computer-executable instructions operable to validate the combined recipe against at least one predefined rule.

In any instance, the product dispenser 204 can dispense the desired product with a combined recipe. The product dispenser 204 may communicate via the reader module 286 with the rewards module 282 of the promotion server 208 to provide certain transaction data, such as product dispenser location, time and/or date of a dispensed product, a product recipe associated with a dispensed, promotion identification code or number, an allocation of rewards or loyalty program points, volume of a dispensed product, information associated with or identifying a consumer to whom a machine readable code was provided to, information associated with or identifying a consumer to whom a product was dispensed to, and any other information associated with a loyalty and/or product promotion program. The promotion server 208 may communicate with a data storage device, such as 288, to store some or all of the transaction data for subsequent processing.

As described in more detail herein, the rewards module 282 may include computer-executable instructions operable to receive transaction data associated with dispensing a product using a combined recipe. In some embodiments, the rewards module 282 may include computer-executable instructions operable to store transaction data associated with dispensing a product using a combined recipe. In some embodiments, the rewards module 282 may include computer-executable instructions operable to allocate reward or loyalty points to a consumer account for dispensing a product using a combined recipe.

A suitable product dispenser 204 may use any number of different ingredients to facilitate providing a product using a combined recipe. In the embodiment of FIG. 2, several different types of ingredients may be used: water (plain and/or carbonated) from a water source; macro-ingredients from a number of macro-ingredient sources; and micro-ingredients from a number of micro-ingredient sources. Any number or combinations of sources may be used herein. For example, it may not be necessary to have a macro-ingredient source, e.g., HFCS (High Fructose Corn Syrup), which is difficult to pump at high reconstitution ratios, may not be used. As such, only a diluent and a micro-ingredient source may be required. In another example, any number of unique ingredient sources may be present in a product dispenser, such as 204. Generally described, the macro-ingredients may have reconstitution ratios in the range of about 3:1 to about 6:1. The viscosities of the macro-ingredients typically range from about 100 centipoise or higher. Macro-ingredients may include sugar syrup, HFCS, juice concentrates, and similar types of fluids. Similarly, a macro-ingredient base product may include sweetener, acid, and other common components. The syrups, sweeteners, and base products generally can be stored in a conventional bag-in-box container remote from the dispenser 204. The macro-ingredients also may be positioned within the product dispenser 204 itself. Any type of container may be used herein in accordance with embodiments of the invention. The macro-ingredients may or may not need to be refrigerated. The micro-ingredients may have a reconstitution ratio ranging from about ten to one (10:1), twenty to one (20:1), thirty to one (30:1), or higher. Specifically, many micro-ingredients may be in the range of fifty to one (50:1) to three hundred to one (300:1). The viscosities of the micro-ingredients typically range from about 1 to about 100 centipoise or so. Examples of micro-ingredients include natural and artificial flavors; flavor additives; natural and artificial colors; artificial sweeteners (high potency or otherwise); additives for controlling tartness, e.g., citric acid, potassium citrate; functional additives such as vitamins, minerals, herbal extracts; nutraceuticals; and over-the-counter (or otherwise) medicines such as acetaminophen and similar types of materials. The acid and non-acid components of the non-sweetened concentrate also may be separated and stored individually. The micro-ingredients may be liquid, powder (solid), or gaseous form and/or combinations thereof. The micro-ingredients may or may not require refrigeration. Non-beverage substances such as paints, dyes, oils, cosmetics, etc., also may be used. Various types of alcohols may be used as micro or macro-ingredients.

In certain instances, the micro-ingredients and the micro-ingredient sources may be positioned within or about the product dispenser 204 itself as opposed to being remotely positioned in conventional bag in box containers or otherwise. By being positioned about the dispenser, the micro-ingredient sources can, for example, be positioned in close proximity to the dispenser 204 such as adjacent thereto, underneath, or in other near by positions. Any other type of storage arrangements may be used in accordance with embodiments of the invention. The macro and/or micro-ingredient sources may optionally be located remotely from the dispenser 204, such as in a back room, connected to the dispenser 204 with conventional tubing. Furthermore, any type of container may be used herein in accordance with embodiments of the invention.

In some embodiments, the product dispenser 204 can be a BIB or "bag-in-box"-type dispenser. Using any number of pumps, sensors, and fluid flow lines for respective product ingredients or components, a BIB or "bag-in-box"-type dispenser can be configured to dispense a combined recipe of different combinations of products offered at the product dispenser.

Thus, in some embodiments, the product dispenser 204 can permit a user to select from any number of particular branded products or beverages and/or non-branded products or beverages. For example, icons associated with the "Cherry Coke®" beverage and the "Coca-Cola®" beverage sold by The Coca-Cola Company of Atlanta, Ga. can be displayed on a user interface, similar to 500 in FIG. 5. The product dispenser 204 thus may provide via the user interface 500 as many branded and/or non-branded products or beverages as may be available from the product dispenser 204.

One will recognize that in other embodiments each of the client module 276, code generation module 280, application program module 281, rewards module 282, and reader module 286 may include other computer-executable instructions to perform similar functionality or operations to that described above. It is appreciated that, in example embodiments, the modules 276, 280, 281, 282, 286 may be provided in part or entirely within the respective client device 202, product dispenser 204, and servers 206, 207, 208, or may be included as a separate computer device and in operable communication with the respective client device 202, product dispenser 204, and servers 206, 207, 208. In yet other embodiments, the respective client device 202, product dispenser 204, and servers 206, 207, 208 may be provided in part or entirely within one or more of the other entities' systems.

The data storage device 288 is represented as single data storage device for simplicity. It is appreciated, however, that multiple physical and/or logical data storage devices or databases may be used to store the above mentioned data. For security and performance purposes, the code generation server 206, application server 207, and/or promotion server 208 may have a dedicated connection to the data storage device 288. However, each of the client device 202, product dispenser 204, code generation server 206, application server 207, and/or promotion server 208 may also communicate with the data storage device 288 via the network 210 shown, or via another network. According to other embodiments, the code generation server 206, application server 207, and/or promotion server 208 may include the data storage device 288 locally, or may include respective data storage devices, similar to 288, locally. Each of the code generation server 206, application server 207, and/or promotion server 208 may also be part of a distributed or redundant DBMS.

It is appreciated that each of the memories and data storage devices described herein for each of the client device 202, product dispenser 204, code generation server 206, application server 207, and/or promotion server 208 can store data and information for subsequent retrieval. The memories and data storage devices can be in communication with each other and/or with other data storage devices, such as a centralized database, or other types of data storage devices. When needed, data or information stored in a memory or a data storage device may be transmitted to a centralized database capable of receiving data, information, or data records from more than one database or other data storage devices. In other embodiments, the data storage devices shown can be integrated or distributed into any number of databases or other data storage devices.

The network 210 may include any number of telecommunication and/or data networks, whether public, private, or a combination thereof, including a local area network, a wide area network, a publicly switched telephone network (PSTN), an intranet, the Internet, intermediate handheld data transfer devices, and/or any combination thereof, and may be wired and/or wireless. The network 210 may also include a product and/or promotion transaction network for processing real-time, off-line, and/or batch transactions to be transmitted between the client device 202, product dispenser 204, code generation server 206, application server 207, and/or promotion server 208. Due to network connectivity, various methodologies as described herein may be practiced in the context of distributed computing environments. Although the system 200 is shown for simplicity as including one intervening network, such as 210, it is to be understood that any other network configuration is possible. For example, an intervening network, such as 210, may include a plurality of networks, each with devices such as gateways and routers, for providing connectivity between or among the networks. Instead of or in addition to a network 210, dedicated communication links may be used to connect the various devices in accordance with an example embodiment of the invention.

In some embodiments, code generation server 206, application server 207, and/or promotion server 208, may be a single service provider computer. One will recognize the applicability of other example embodiments of the invention to more than two computers or servers.

The system 200 shown in FIG. 2 is provided by way of example only. One will recognize that other embodiments can include other client devices, product dispensers, and servers within the system 200. Numerous other operating environments, system architectures, and device configurations with fewer or greater numbers of components are possible. Accordingly, embodiments of the invention should not be construed as being limited to any particular operating environment, system architecture, or device configuration.

FIG. 3 is an example of information or data encoded by a machine readable item in accordance with an embodiment of the invention. The information 300 shown in FIG. 3 is shown as a series of fields with various information stored in each of the fields. By way of example only as shown in the this embodiment, suitable information 300 can include a product dispenser identifier 302, a date and time 304, a product identifier 306, a consumer identifier 308, a promotion identifier 310, first recipe identifier 312, a ratio for a first recipe 314, a second recipe identifier 316, a ratio for a second recipe 318, a third recipe identifier 320, a ratio for a third recipe 322, a graphic identifier 324, a background image identifier 326, a machine readable item identifier 328, and a message and/or text 330. Any number of recipe identifiers and respective ratios can be encoded in a machine readable item. For example, one machine readable item can have up to 16 different recipes and respective ratios encoded therein, thus requiring 16 recipe identifiers, similar to 312, 316, 320, and 16 respective ratios, similar to 314, 318, and 322. One will recognize that other embodiments of a machine readable item can include similar or different, and fewer or greater quantities and/or fields of information encoded therein. In any instance, the information 300 shown in FIG. 3 can be encoded in and used to generate a machine readable item, such as 400 in FIG. 4.

In some embodiments, any number of predefined graphics, background images, and messages and/or text for a user interface of a product dispenser can be stored locally at a product dispenser, such as 204 in FIG. 2. In certain embodiments, any number of predefined graphics, background images, and messages and/or text for a user interface 500 can be stored on a network accessible data storage device, such as 288 in FIG. 2. In any instance, a user interface for a product dispenser can be configured using information stored in a machine readable item, such as designating particular identifiers using some or all of the following: a graphic identifier 324, a background image identifier 326, and a message and/or text 330.

In some embodiments, a promotional and/or loyalty program can utilize some or all of the information shown in FIG. 3. For example, using a product dispenser identifier 302, a promotional and/or loyalty program can control the number of rewards or loyalty points provided to one or more consumers utilizing a particular product dispenser. In particular, 3 reward or loyalty points may be awarded for using a unique product dispenser. In another example, date and/or time 304 can be used to check whether a particular product can be dispensed within a predefined promotional period. In particular, if a machine readable item is scanned at 2 pm on a Thursday for a promotion running between 3-4 pm on Thursdays, a block on dispensing the desired product can be enabled. As another example, a consumer identifier 308 can be used by a promotional and/or loyalty program to track who receives a particular promotional or loyalty offer, and who ultimately takes advantage of a particular promotional or loyalty offer. In particular, a demographic group, such as men aged 25-34 years old, can be targeted and tracked using consumer identifiers. By way of another example, a promotion identifier 310 can be used by a promotional and/or loyalty program to track any number of promotions targeting different demographic groups. In particular, a consumer may be identified as belonging to 6 different targeted demographic groups, and thus at least 6 different promotions may need to be tracked. By way of yet another example, a promotion identifier 310 can be used by a product dispenser 204 for comparison against a configuration file at or accessible by the product dispenser 204 to confirm whether a certain promotion is valid at or on the product dispenser 204.

FIG. 4 is an example machine readable item in accordance with an embodiment of the invention. The machine readable item 400 shown in FIG. 4 is shown as a QR code, which embodies some or all of the information stored shown in FIG. 3. The machine readable item, such as 300, may include encryption (such as 128 or 256 bit encryption) or other suitable measure of security. Other suitable machine readable items can include, but are not limited to, a bar code, a 2D bar code, a RFID tag, a NFC chip, a data matrix, an alphanumeric string, a character string, a short message service or text message, encoded data, or encrypted data.

FIG. 5 is a schematic view of an example user interface 500 for use with a product dispenser, such as 112 of FIG. 1 and 204 of FIG. 2, in accordance with an embodiment of the invention. The user interface 500 shown in FIG. 5 can be generated using certain information stored in a machine readable item, such as 400 in FIG. 4. As shown in FIG. 5, the user interface 500 can be a graphical interface, which may include one or more physical buttons and/or computer generated touch screen display buttons or icons. In any instance, the interface 500 may include one or more predefined product identification buttons 502. Each product identification button 502 may represent a different product or beverage, such as a desired product with a combined recipe. When a machine readable item, such as 114 in FIG. 1, is input to the product dispenser 112, a corresponding product identification button 502 can be generated for each constituent product recipe encoded in the machine readable item. Another product identification button, similar to 502, may be generated to correspond with the desired product with the combined recipe. The user interface 500 may also include one or more third party trademarks and/or logos 504 as well as a vendor trademark and/or logo 506. Personalized text and/or messages 508 can be provided on the user interface 500. Furthermore, the user interface can include a background screen 510. In any instance, a desired interface, such as 500, can be generated when a desired product or beverage with a combined recipe is to be dispensed by the product dispenser 112.

In some embodiments, the use of certain third party trademarks and/or logos 504 on the interface 500 may be controlled via data encoded in the machine readable item 114. One or more third party trademarks and/or logos 504 may be stored locally on the product dispenser 112, or remotely on a data storage device or server accessible via a network, for use on the interface 500, and may be referenced by data encoded in the machine readable item 114. For example, a promotion identifier, such as 310 in FIG. 3, encoded in the machine readable item 114 can be used to obtain one or more previously stored third party trademarks and/or logos, such as 504, for display on the interface 500 when the machine readable item 114 is input to the product dispenser 112.

In some embodiments, nutritional information associated with a combined recipe can be generated and output for display to a user. For example, for each constituent product in a combined recipe encoded in a machine readable item 114, the product dispenser 112 may determine nutritional information for the combined recipe, such as the number of calories, total fat, sodium amount, total carbohydrate, sugar amount, and protein in a predefined serving amount of the combined recipe. The product dispenser 112 may access nutritional information previously stored at the product dispenser or stored remotely on a data storage device or server accessible via a network. In some instances, nutritional information for one or more product recipes may be encoded in the machine readable item 114. In any instance, the product dispenser 112 can determine nutritional information for a combined recipe while accounting for the ratios of one or more product recipes used in the combined recipe.

In certain embodiments, the user interface 500 operating alone or in conjunction with a communications device and/or a biometrics sensor may provide a user, such as an individual product dispenser operator, with secure access by password, smart card, biometric identification, credit card, RFID, or otherwise. User or operator preferences also may be retained and used for future product dispenser use and/or maintenance. The user interface 500 may provide other product statistics, such as nutritional information, dispenser statistics, and troubleshooting information. The user interface may be password or otherwise protected. The user interface may communicate and/or be accessed as needed with a network or other source for troubleshooting or repair and for notifications or alerts.

Figure 6:
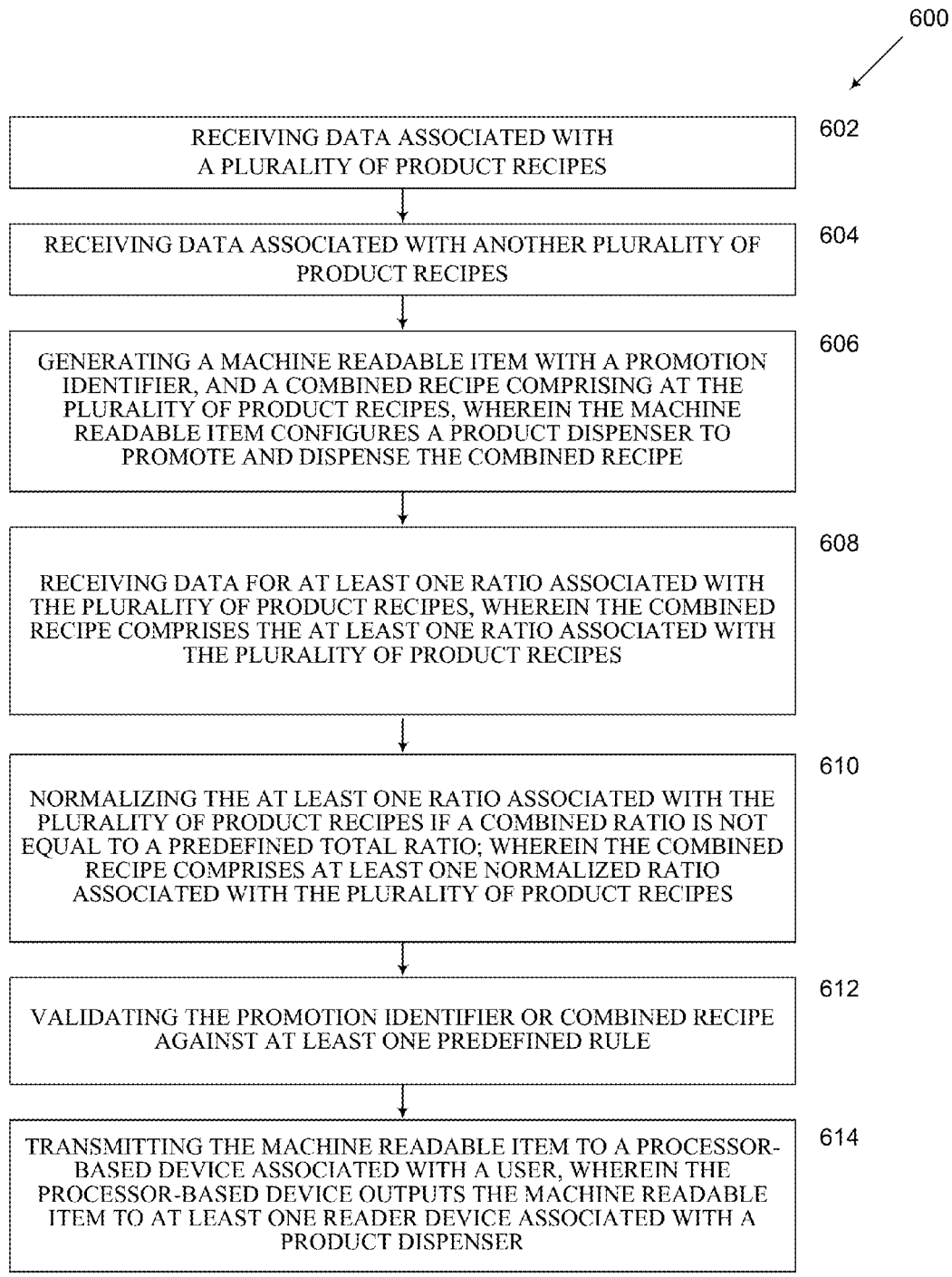
FIG. 6 is a schematic flowchart for a method for providing a product for dispensing from a product dispenser in accordance with an embodiment of the invention.

FIG. 6 is a process flowchart illustrating an example method in accordance with an embodiment of the invention. The example method 600 shown in FIG. 6 provides a method for providing a promotion for a product dispensed from a product dispenser. In particular, the method 600 is a method for providing a promotion for a combined product dispensed from a product dispenser using a plurality of product recipes. The method 600 can be implemented by various system and/or product dispenser components shown in FIGS. 1-3.

The method 600 begins at block 602. In block 602, data associated with a plurality of product recipes is received. Block 602 is followed by optional block 604, in which data associated with another plurality of product recipes is received. Block 604 is followed by block 606, in which a machine readable item is generated with a promotion identifier, and a combined recipe comprising the plurality of product recipes, wherein the machine readable item configures a product dispenser to promote and dispense the combined recipe. In some embodiments, a machine readable item is generated with a promotion identifier, and a combined recipe comprising the plurality of product recipes and the other plurality of product recipes, wherein the machine readable item configures a product dispenser to promote and dispense the combined recipe.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, generating the machine readable item can include at least one of the following: storing encoded data, printing encoded data, displaying encoded data, electronically transmitting encoded data for printing or displaying by a user, or outputting encoded data.

Block 606 is followed by optional block 608, in which data for at least one ratio associated with the plurality of product recipes is received, wherein the combined recipe comprises the at least one ratio associated with the plurality of product recipes. In some embodiments, the data for the ratios associated with the plurality of product recipes may or may not be encoded in the machine readable item. Block 608 is followed by optional block 610, in which at least one ratio associated with the plurality of product recipes is normalized if a combined ratio is not equal to a predefined total ratio, wherein the combined recipe comprises at least one normalized ratio associated with the plurality of product recipes. Block 610 is followed by optional block 612, in which the promotional identifier or combined recipe is validated against at least one predefined rule. In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients. Block 612 is followed by block 614, in which the machine readable item is transmitted to a processor-based device associated with user, wherein the processor-based device outputs the machine readable item to at least one reader device associated with a product dispenser. The method 600 of FIG. 6 ends after block 614.

Figure 7:
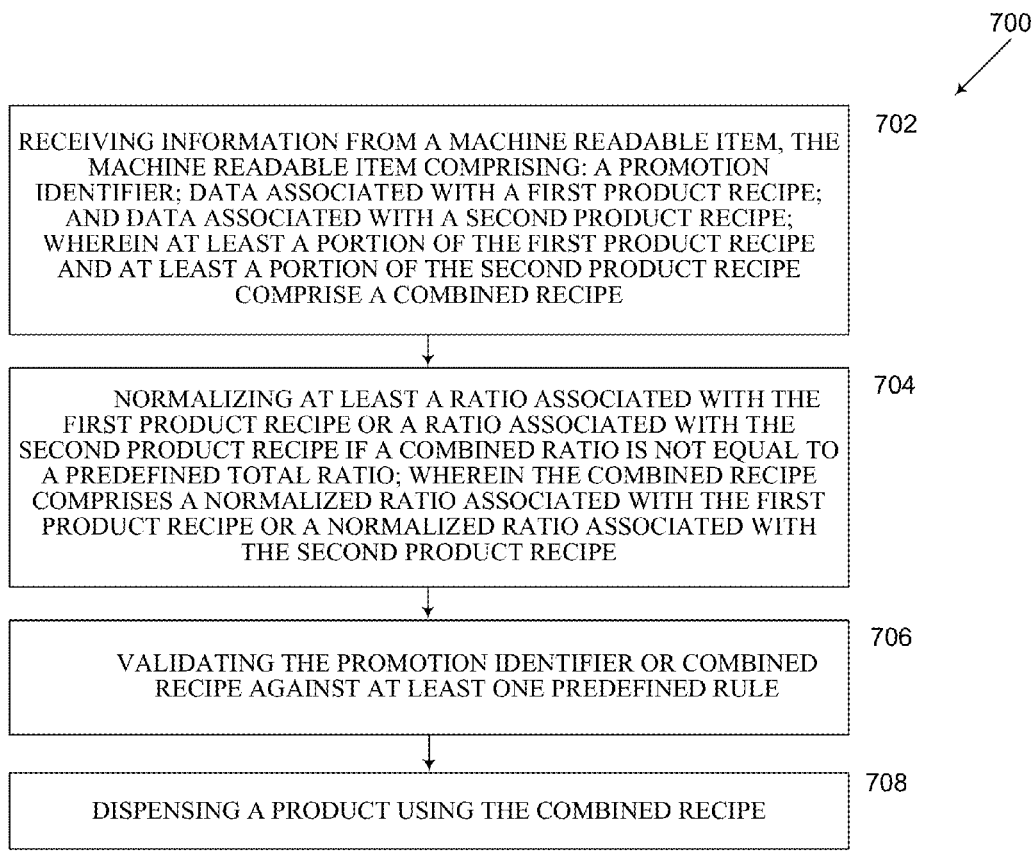
FIG. 7 is a schematic flowchart for another method for providing a product for dispensing from a product dispenser in accordance with an embodiment of the invention.

FIG. 7 is a process flowchart illustrating another example method in accordance with an embodiment of the invention. The example method 700 shown in FIG. 7 provides a method for dispensing a product from a product dispenser. In particular, the method 700 is a method for providing a promotion for a combined product dispensed from a product dispenser using at least two product recipes. The method 700 can be implemented by various system and/or product dispenser components shown in FIGS. 1-2.

The method 700 begins at block 702. In block 702, information is received from a machine readable item, the machine readable item comprising: a promotion identifier and data associated with a plurality of product recipes; wherein the plurality of product recipes comprises a combined recipe. In some embodiments, information is received from a machine readable item, the machine readable item comprising: a promotion identifier; data associated with a plurality of product recipes; and data associated with another plurality of product recipes; wherein the plurality of product recipes and the other plurality of product recipes comprise a combined recipe In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

In some embodiments, receiving information from a machine readable item can include at least one of the following: receiving encoded data, receiving printed encoded data, receiving displayed encoded data, receiving a QR code from a mobile device, receiving a printed QR code, or electronically receiving encoded data.

Block 702 is followed by optional block 704, in which at least a ratio associated with the plurality of product recipes is normalized if a combined ratio is not equal to a predefined total ratio, wherein the combined recipe comprises at least one normalized ratio associated with the plurality of product recipes. Block 704 is followed by optional block 706, in which the promotional identifier or combined recipe is validated against at least one predefined rule. In some embodiments, at least one predefined rule can include at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients. Block 706 is followed by block 708, in which a product is dispensed using the promotional identifier and combined recipe. In some embodiments, the product can be dispensed either continuously or sequentially depending on the nature of the product, the combined recipe, the constituent ingredients, the product dispenser and/or the preference of a consumer or user. The method 700 of FIG. 7 ends after block 708.

Figure 8:
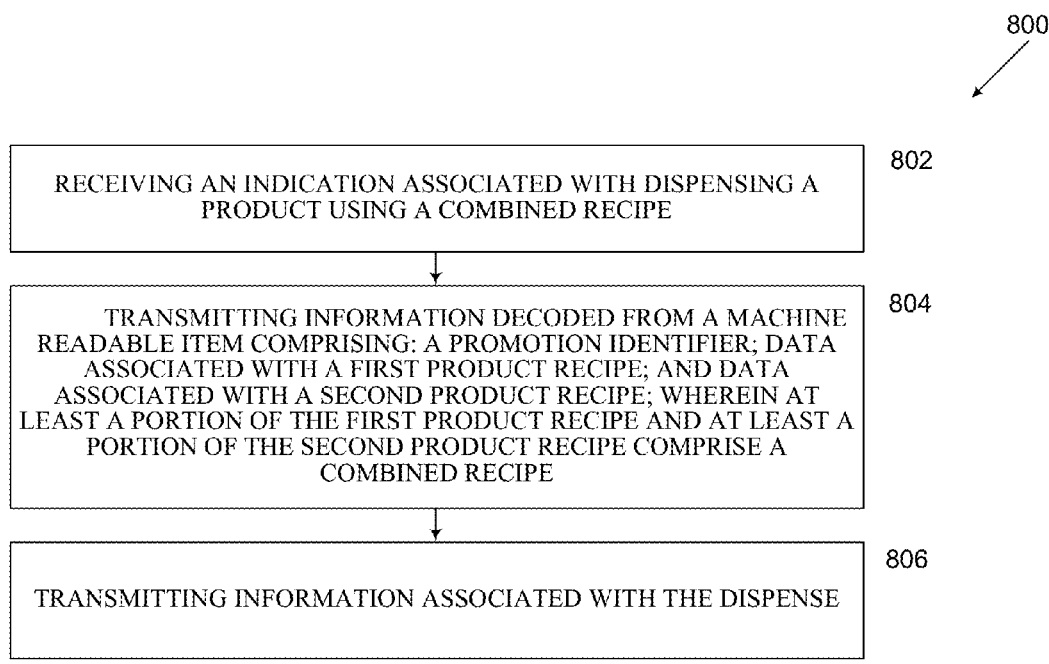
FIG. 8 is a schematic flowchart for a method for reporting a dispense of a product with a combined recipe from a product dispenser in accordance with an embodiment of the invention.

FIG. 8 is a process flowchart illustrating another example method in accordance with an embodiment of the invention. The example method 800 shown in FIG. 8 provides a method for reporting a dispense of a product with a combined recipe from a product dispenser. In particular, the method 800 is a method for providing information about dispensing a combined product with a plurality of product recipes from a product dispenser. The method 800 can be implemented by various system and/or product dispenser components shown in FIGS. 1-2.

The method 800 begins at block 802. In block 802, an indication is received associated with dispensing a product using a combined recipe. In the embodiment shown in FIG. 8, a processor or module associated with a product dispenser and/or a server can receive the indication, which may be a signal or a message.

Block 802 is followed by block 804, in which information decoded from a machine readable item is transmitted, wherein the machine readable item comprises a promotion identifier and data associated with a plurality of product recipes; wherein the plurality of product recipes comprises a combined recipe. In some embodiments, information decoded from a machine readable item is transmitted, wherein the machine readable item comprises a promotion identifier, data associated with a plurality of product recipes, and data associated with another plurality of product recipes; wherein the plurality of product recipes and other plurality of product recipes comprise a combined recipe. In the embodiment shown in FIG. 8, the information can be transmitted by a processor associated with a product dispenser, server, and/or one or more modules associated with the product dispenser or server. The transmitted information can be received by a data storage module, backend server, and/or a data analytics module, wherein subsequent processing of the information can be implemented.

In some embodiments, a machine readable item can include at least one of the following: a bar code, a 2D bar code, a QR code, a RFID tag, a NFC chip, a data matrix, an alphanumeric string, a character string, a short message service or text message, encoded data, or encrypted data.

Block 804 is followed by block 806, in which information associated with the dispense is transmitted. In the embodiment shown in FIG. 8, the information can be transmitted by a processor associated with a product dispenser, server, and/or one or more modules associated with the product dispenser or server. In some embodiments, the information associated with the dispense can include the location of a product dispenser performing the dispense, the date and/or time of the dispense, consumer identification information, consumer preference data, and promotion data. The transmitted information can be received by a data storage module, backend server, and/or a data analytics module, wherein subsequent processing of the information can be implemented.

The method 800 of FIG. 8 ends after block 806.

The example elements of FIGS. 6, 7, and 8 are shown by way of example, and other process embodiments can have fewer or greater numbers of elements, and such elements can be arranged in alternative configurations in accordance with other embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational elements or steps to be performed on the computer or other programmable apparatus to produce a computer implemented process such that the instructions that execute on the computer or other programmable apparatus provide elements for implementing the functions specified in the flowchart block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

The capabilities of various embodiments of the invention can be implemented in software, firmware, hardware or some combination thereof.

As one example, one or more aspects of the invention can be included in an article of manufacture (e.g., one or more computer program products) having, for instance, computer usable media. The media has embodied therein, for instance, computer readable program code means for providing and facilitating the capabilities of the embodiment of the invention. The article of manufacture can be included as a part of a computer system or sold separately.

Additionally, at least one program storage device readable by a machine, tangibly embodying at least one program or set of instructions executable by the machine to perform the capabilities of the embodiment of the invention can be provided.

The flow diagrams depicted herein are examples. There may be many variations to these diagrams or the elements (or operations) described therein without departing from the scope of the claimed invention. For instance, the elements may be performed in a differing order, or elements may be added, deleted or modified. All of these variations are considered a part of the claimed inventions.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A system for providing a promotion for a combined product dispensed from a product dispenser, the system comprising:
   a computing device comprising a memory and a processor, the memory comprising a code generation module executed by the processor, wherein the code generation module:
      receives data associated with a first product recipe of a first finished product dispensable by the product dispenser;
      receives data associated with a second product recipe of a finished product dispensable by the product dispenser;
      generates a machine readable item with:
         a promotion identifier, and
         a combined recipe comprising at least the first product recipe and the second product recipe, wherein the machine readable item configures the product dispenser to dispense the combined recipe; and
   a product dispenser for dispensing a beverage including the combined recipe, wherein the product dispenser receives the combined recipe for validation of the promotion identifier against at least one predefined rule, and wherein the product dispenser combines the first product recipe and the second product recipe and dispenses the combined recipe when the promotion identifier is validated for the dispenser.

2. The system of claim 1, wherein the code generation module:
   receives data for a ratio associated with the first product recipe; and
   receives data for a ratio associated with the second product recipe;
   wherein the combined recipe comprises the ratio associated with the first product recipe and the ratio associated with the second product recipe.

3. The system of claim 1, wherein the code generation module:
   normalizes at least a ratio associated with the first product recipe or a ratio associated with the second product recipe if a combined ratio is not equal to a predefined total ratio;
   wherein the combined recipe comprises a normalized ratio associated with the first product recipe or a normalized ratio associated with the second product recipe.

4. The system of claim 1, wherein the machine readable item comprises at least one of the following: a bar code, a 2D bar code, a QR code, a RFID tag, a NFC chip, a data matrix, an alphanumeric string, a character string, a short message service or text message, encoded data, or encrypted data.

5. The system of claim 1, wherein the code generation module performs at least one of the following: stores encoded data associated with the combined recipe, prints encoded data associated with the combined recipe, displays encoded data associated with the combined recipe, electronically transmits encoded data associated with the combined recipe for printing or displaying by a user, or outputs encoded data associated with the combined recipe.

6. The system of claim 1, wherein the at least one predefined rule comprises at least one of the following: a date or time for a predefined promotion, a location for a predefined promotion, a type of predefined promotion, a restriction on a location to dispense a combined recipe, a limit on an amount of at least one ingredient in the combined recipe, a limit on an amount of at least one type of ingredient in the combined recipe, or a restriction on a combination of at least two ingredients.

7. The system of claim 1, wherein the code generation module:
   transmits the machine readable item to a processor-based device associated with the user, wherein the processor-based device outputs the machine readable item to at least one reader device associated with a product dispenser.

8. A method for providing a promotion for a combined product dispensed from a product dispenser, the method comprising:
   receiving, by a code generation module executing on a computing device, data associated with a plurality of product recipes, the plurality of product recipes comprising at least a first finished beverage product dispensable by the product dispenser and a second finished beverage product dispensable by the product dispenser;
   generating, by the code generation module executing on the computing device, a machine readable item with a promotion identifier, and a combined recipe comprising at least the first finished beverage product and the second finished beverage product, wherein the machine readable item causes a product dispenser to combine the first finished beverage product and the second finished beverage product and dispense the combined recipe, the product dispenser receiving the combined recipe for validation of the promotion identifier against at least one predefined rule, wherein the at least one predefined rule includes a date or time for a predefined promotion, or a location for a predefined promotion.

9. The method of claim 8, the method further comprising:
receiving data for at least one ratio associated with the plurality of product recipes; and
wherein the combined recipe comprises the at least one ratio associated with the plurality of product recipes.

10. The method of claim 8, the method further comprising:
normalizing at least one ratio associated with the plurality of product recipes if a combined ratio is not equal to a predefined total ratio;
wherein the combined recipe comprises at least one normalized ratio associated with the plurality of product recipes.

11. The method of claim 8, wherein the machine readable item comprises at least one of the following: a bar code, a 2D bar code, a QR code, a RFID tag, a NFC chip, a data matrix, an alphanumeric string, a character string, a short message service or text message, encoded data, or encrypted data.

12. The method of claim 8, wherein generating the machine readable item comprises at least one of the following: storing encoded data, printing encoded data, displaying encoded data, electronically transmitting encoded data for printing or displaying by a user, or outputting encoded data.

13. The method of claim 8, wherein the at least one predefined rule comprises at least one of the following: a limit on an amount of at least one ingredient in the combined recipe, a limit on an amount of at least one type of ingredient in the combined recipe, or a restriction on a combination of at least two ingredients.

14. The method of claim 8, further comprising:
transmitting the machine readable item to a processor-based device associated with a user, wherein the processor-based device outputs the machine readable item to at least one reader device associated with a product dispenser.

15. A product dispenser comprising:
a memory; and
a processor, the memory comprising a reader module executed by the processor, the reader module:
receives data associated with a machine readable item, the machine readable item comprising:
a promotion identifier; and
a combined recipe comprising at least a first product recipe and a second product recipe, the first product recipe comprising a first dispensable finished product, the second product recipe comprising a second dispensable finished product;
configures the dispense of the combined recipe by combining the first product recipe and the second product recipe according to the combined recipe; and
validates the promotion identifier against at least one predefined rule based on the dispense of the combined recipe, wherein the at least one predefined rule includes a date or time for a predefined promotion, or a location for a predefined promotion;
wherein the product dispenser dispenses the combined recipe when the at least one predefined rule is met.

16. The product dispenser of claim 15, wherein the reader module receives the data associated with the machine readable item from a processor-based device associated with a user.

17. The product dispenser of claim 15, wherein the machine readable item comprises at least one of the following: a bar code, a 2D bar code, a QR code, a RFID tag, a NFC chip, a data matrix, an alphanumeric string, a character string, a short message service or text message, encoded data, or encrypted data.

18. The product dispenser of claim 15, wherein the at least one predefined rule comprises at least one of the following: a limit on an amount of at least one ingredient in the combined recipe, a limit on an amount of at least one type of ingredient in the combined recipe, or a restriction on a combination of at least two ingredients.

\* \* \* \* \*